(12) United States Patent
Shiohara (10) Patent No.: US 7,154,543 B1
(45) Date of Patent: Dec. 26, 2006

(54) DIGITAL CAMERA AND METHOD OF CHANGING DATA PROCESSING SEQUENCE USED FOR THE SAME

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/419,070

(22) Filed: Oct. 15, 1999

Related U.S. Application Data (63) Continuation-in-part of application No. PCT/JP98/01252, filed on Mar. 20, 1998.

(30) Foreign Application Priority Data

| Apr. 16, 1997 | (JP) | ................................... 9-099454 |
| Mar. 12, 1998 | (JP) | ................................... 10-061020 |

(51) Int. Cl.
*H04N 5/76* (2006.01)
*H04N 5/222* (2006.01)

(52) U.S. Cl. ................................ 348/231.2; 348/231.3

(58) Field of Classification Search .......... 348/231.99, 348/231.1, 231.2, 231.3, 231.5, 231.6, 220.1, 348/333.01, 333.02, 333.12, 552
See application file for complete search history.

(56) References Cited

U.S. PATENT DOCUMENTS

| 5,633,678 | A | * | 5/1997 | Parulski et al. ........... 348/231.5 |
| 5,689,303 | A | | 11/1997 | Kuroiwa | |
| 5,719,987 | A | * | 2/1998 | Kawamura et al. ....... 348/220.1 |
| 5,806,072 | A | * | 9/1998 | Kuba et al. ............... 348/231.2 |
| 6,330,028 | B1 | * | 12/2001 | Oie et al. ................. 348/231.1 |
| 6,452,630 | B1 | * | 9/2002 | Haruki ..................... 348/231.6 |
| 2003/0128283 | A1 | * | 7/2003 | Watanabe et al. ........ 348/231.9 |

FOREIGN PATENT DOCUMENTS

| JP | 6-197308 A | 7/1994 |
| JP | 8-197308 | 7/1994 |
| JP | 07-115536 A | 5/1995 |
| JP | 08-180201 | 7/1996 |
| JP | 09-098363 A | 4/1997 |
| JP | 9-102922 | 4/1997 |
| JP | 9-130717 | 5/1997 |
| JP | 9-307851 | 11/1997 |

OTHER PUBLICATIONS

International Search Report PCT/JP98/01252.

* cited by examiner

*Primary Examiner*—Luong T. Nguyen
(74) *Attorney, Agent, or Firm*—Sughrue Mion, PLLC (57) ABSTRACT

A digital camera such that the order of processing of image data recorded on a recording medium and a method of changing the order of processing of the recorded image data. When an image is recorded, information concerning image data is recorded in an image data management file as a management record of respective image data units. The image number of the images of which the order or processing is desired to be changed is determined, and a desired, processing order is determined. The management records after the image number are saved and the control record of the image to be processed is written in the control record position of the desired processing order. The saved control records are written in the control record positions in the desired order, and the written image numbers are rearranged in the ascending order.

14 Claims, 11 Drawing Sheets

| IMAGE NUMBER | RECORDING START POSITION | RECORDING END POSITION | POINTER | ASSOCIATED IMAGE NUMBER | FLAG |
|---|---|---|---|---|---|
| 511 | 512 | 513 | 514 | 515 | 516 |

| FILE NAME | POINTER |
|---|---|
| Image001 | u |
| Image002 | v |
| Image003 | w |
| Image004 | x |
| Image005 | y |

| FILE NAME | POINTER |
|---|---|
| Image001 | u |
| Image003 | v |
| Image004 | w |
| Image005 | x |
| Image002 | y |

DIGITAL CAMERA AND METHOD OF CHANGING DATA PROCESSING SEQUENCE USED FOR THE SAME

CROSS-REFERENCE TO RELATED APPLICATION

This is a continuation-in-part application of PCT/JP98/01252 filed on Mar. 20, 1998 which claims benefit of priority based on Japanese Application Nos. Hei. 9-99454, filed Apr. 16, 1997 and Hei. 10-61010, filed Mar. 12, 1998.

BACKGROUND OF THE INVENTION

The present invention relates to a digital camera and, more particularly, a digital camera which can change the processing sequence such as display sequence of image data recorded on a recording medium.

Upon taking pictures successively, there may be occurred such a case wherein after pictures of a certain object A are taken and then pictures of another object B are taken, a photographer wants to take pictures of the object A again due to some reason, for example, he could not or forgot to take desired images. It is of course that the suceedingly taken picture of the object A is recorded after the pictures of the object B. In such case, if the suceedingly taken picture of the object A can be rearranged to continue to the precedingly taken pictures of the object A, it is convenient for handling. According to the normal camera using the film, since the taken pictures are recorded on the film in time series, it is very difficult to change sequence of the taken pictures on the film.

SUMMARY OF THE INVENTION

In recent years, the digital camera (electronic still camera) are now spreading. Since image data which are picked up and recorded by the digital camera are electronic data (digital data), it is convenient for the user if picked-up and recorded sequence of the image data can be changed to display them when the image data are displayed on a liquid crystal display, and if the image data can be transmitted while changing the sequence of the image data when the image data are transmitted to a personal computer (abbreviated as "PC" hereinafter). Especially, in the digital camera which has a function for reproducing the recorded images in order, it is very convenient if the user can change the reproduction order.

The present invention has been made in view of the above requests, and it is an object of the present invention to provide a digital camera which can change processing sequence of the image data recorded on the recording medium into desired sequence, and a method of changing processing sequence of image data recorded in a digital camera.

In order to achieve this object, according to the present invention, there is provided a digital camera for recording image data onto a recording medium by converting an image pickup light photoelectrically, comprising: an image data management file for storing a plurality of recording information of the recorded image data in connection with the respective image data, the image data management file stored into the recording medium separately from the image data; and means for updating the image data management file.

Processing sequence of the recorded image data is changed by updating at least a part of the plurality of recording information stored in the image data management file.

The digital camera further comprises display means for displaying the recorded image data. An order of which the image data are displayed on the display means is changed in compliance with the change of the processing sequence.

The digital camera further comprises output means for outputting the recorded image data to an external device. An order of which the image data are outputted to the external device is changed in compliance with the change of the processing sequence.

The digital camera of the present invention other than the above contains those evident from description of the best modes for implementing the present invention or the drawings as an aspect of the present invention.

According to the present invention, there is also provided a method of changing processing sequence of image data recorded in a recording medium of a digital camera by converting an image pick up light photoelectrically, the digital camera an image data management file for storing a plurality of recording information of the recorded image data in connection with the respective image data, the image data management file stored into the recording medium separately from the image data, the method comprising the steps of: deciding processing sequence of predetermined image data; and updating the image data management file in compliance with the processing sequence.

The step of updating the image data management file includes a step of updating at least a part of a plurality of recording information stored in the image data management file.

The method for the digital camera of the present invention other than the above contains those evident from description of the best modes for implementing the present invention or the drawings as an aspect of the present invention.

BRIEF DESCRIPTION OF THE DRAWINGS

In the accompanying drawings:

FIGS. 1(a) and (b) are block diagrams showing an example of a configuration of a digital camera according to the present invention;

DETAILED DESCRIPTION OF THE PREFERRED EMBODIMENTS

Next, embodiments of the present invention will be explained with reference to the accompanying drawings hereinafter.

Figure 1:
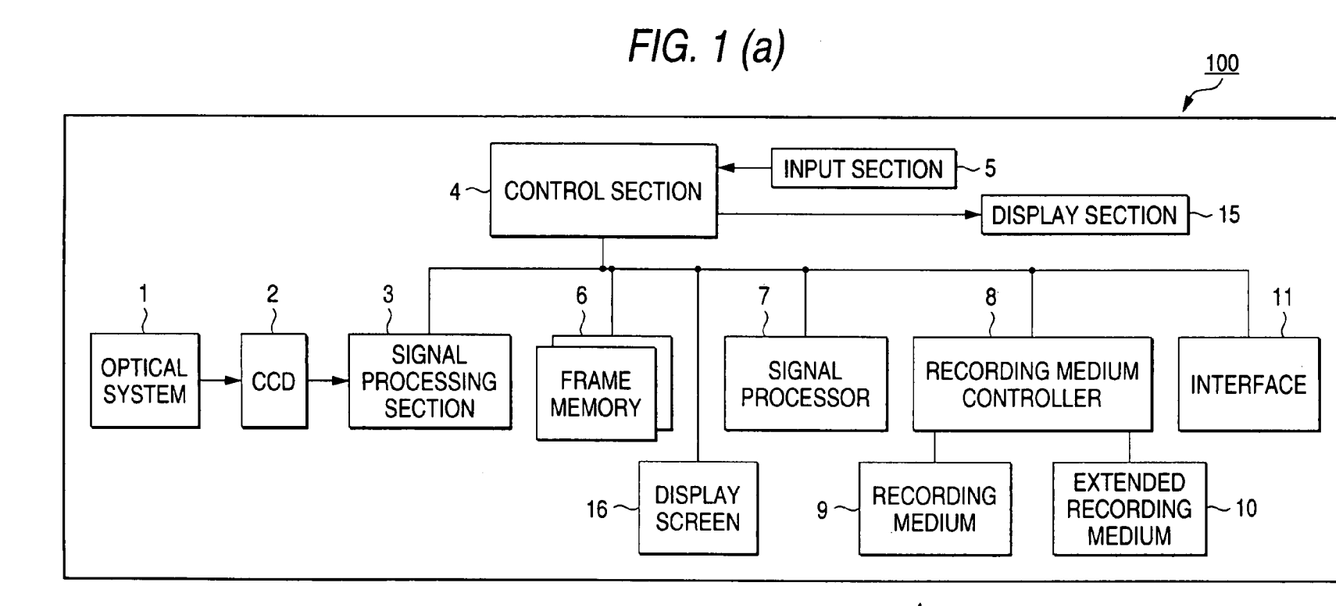

FIG. 1(a) is a block diagram showing an example of a configuration of a digital camera according to the present invention. The digital camera 100 comprises an optical system 1 composed of lenses, a diaphragm mechanism, etc., and for irradiating a reflected light reflected from an imaging object onto a CCD 2; the CCD 2 for converting an image pickup light supplied from the optical system 1 into an electric signal; a signal processor 3 for processing the signal from the CCD 2 and then outputting the signal as multi-valued (R, G, B) raster data (image data) to a frame memory 6; a control section 4 for controlling operations of the signal processor 3, the frame memories 6, a signal processor 7 and a recording medium controller 8, and controlling the image processing, the image compressing/expansion processings, etc.; an input section 5 for inputting an instruction from the user by the operation of the switch, etc. to provide it to the control section 4; the signal processor 7 for converting the R, G, B raster data on the frame memory 6 into a luminance component Y and color difference components U, V, JPEG (Joint Photographic Experts Group)-compressing these components, and executing the contraction processing to generate thumbnail image; the recording medium controller 8 for receiving the output of the signal processor 7, and executing the controls to write JPEG-compressed image data (referred to as "JPEG image data" hereinafter) and thumbnail image data into a predetermined location of a built-in recording medium 9 or an extended recording medium 10, to read respective recorded JPEG image data, etc.; the built-in recording medium 9 for storing the JPEG image data; the extended recording medium 10 which is attached as occasion demands; an interface 11 employed to communicate the data with external devices; a display section 15 composed of LED indicators, etc., for displaying operation states of the switch and functional specifications; and a display screen 16 composed of a liquid crystal display, etc., for displaying the picked-up image or the imaging object image.

The built-in recording medium 9 is composed of a 4 MB flash memory being fixed on the inside of the camera 100. A 4 to 45 MB compact flash (trademark of SanDisk Corporation) card is employed as the extended recording medium 10. As the built-in recording medium 9 and the extended recording medium 10, a SRAM (Static RAM), a memory card, a FD (floppy disk), HDD (hard disk drive), MD (mini disk), etc. may be employed.

FIG. 1(b) shows a configuration of the control section 4. The control section 4 is composed of a CPU 41, a RAM 42, and a ROM 43. Control means 430 (FIG. 2) which consists of a group of programs necessary for operation control and data processing in the digital camera 100 is stored in the ROM 43. If a group of programs constituting a controller 430 stored in the ROM 43 are stored in the built-in recording medium 9, the ROM 43 may be omitted.

Figure 2:
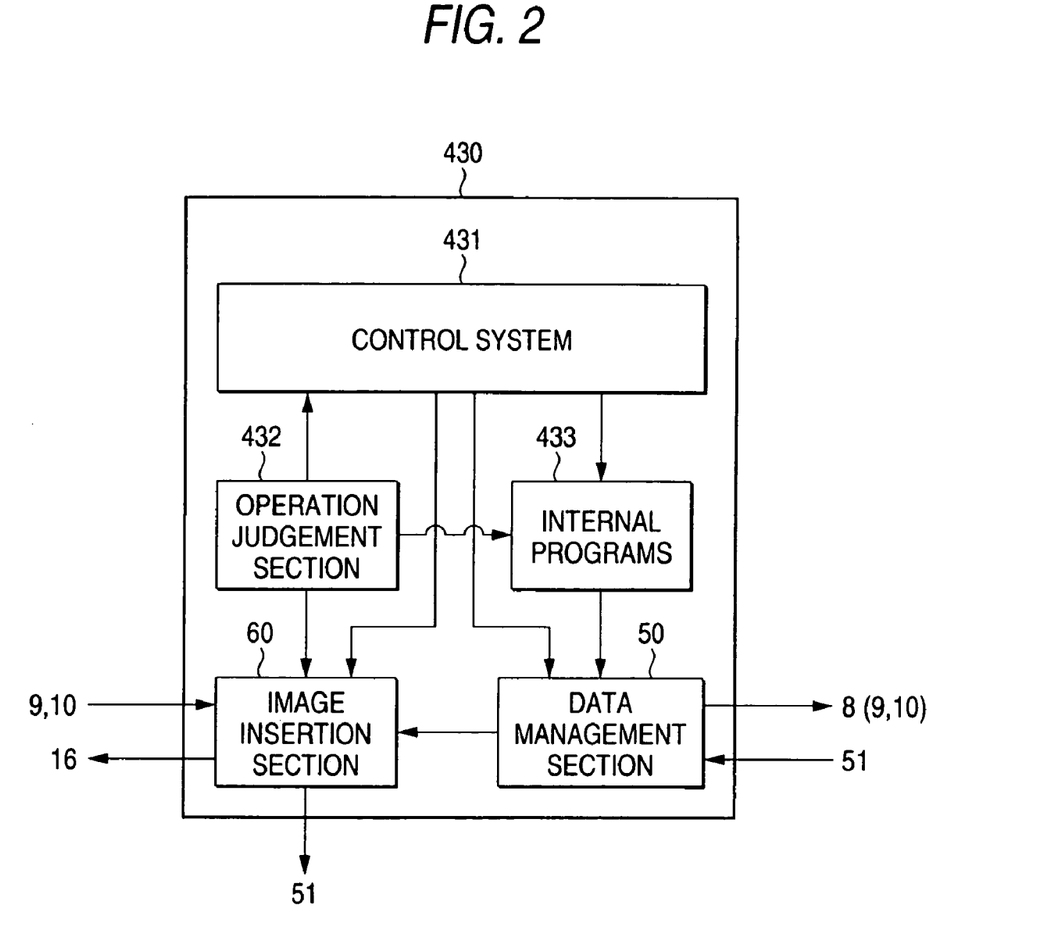
FIG. 2 is a view showing an example of a configuration of a controller.

FIG. 2 is a view showing an example of a configuration of the controller 430 stored in the ROM 43. The controller 430 is composed of a means required for the operation control of the digital camera 100, and an means required for the JPEG compression of the image data, storing/reading of the JPEG image data, or the expansion of the JPEG image data.

The controller 430 comprises a control system 431, an operation judgement section 432, internal programs 433, data management section 50, and an image insertion section 60. Although the a data management section 50 and the image insertion section 60 are contained in the internal programs 433 in the embodiment, they are illustrated independently by way of explanation.

The control system 431 executes an overall operation control of the digital camera 100, for example, control of a diaphragm motor driver (not shown) of the optical system, operation controls of the signal processor 3, the frame memory 6, the signal processor 7 and the recording medium controller 8, and controls of the operation judgement section 432, the data management section 50, and the image insertion section 60.

The operation judgement section 432 judges what operation is input from the input section 5 in accordance with the instruction given by the user when a desired operation or processing is selected by the user to operate the switch, etc. provided on the digital camera 100. In response to the decision result, the operation judgement section 432 transfers the control to the concerned program of the internal programs 433 to the image insertion section 60, or transfers the control to the control system 431 to execute the externally introduced program.

The internal programs 433 are made up of programs for picking up the images, generating the JPEG image data, and controlling LED display at the time of picking up the image, etc., and are built in the ROM 43. As an example of the internal program, there is a compression program in the JPEG specification, which is necessary for writing the JPEG image data into the built-in recording medium 9.

The image data (JPEG image data) are processed by the internal programs 433 or a circuit equivalent thereto, and stored in the built-in recording medium 9 or the extended recording medium 10 by the recording medium controller 8.

The data management section 50 associates with load/deletion/addition of the picked-up image data into/from/into the recording medium 9 and load/deletion/addition of the program code introduced from the external device, and executes data management which is equivalent to file management being widely conducted by the computer device such as the PC, etc. For example, there is the file management in MS-DOS (trademark of Microsoft Corporation), etc.

The generated image data are loaded onto the recording medium 9 or the extended recording medium 10 by the recording medium controller 8. In this case, there is a necessity that the recording location of the image data on the recording medium 9 must be managed. For example, the data must be written into empty areas, i.e., write enable areas when the image data are recorded, but there is a need that the recording medium controller 8 must know which area of the recording medium 9 is the empty areas.

For this reason, the data management section 50 is constructed to handle a sheet of image data as the data file, provide separately its register list, e.g., directory, and record the register list itself in a predetermined location of the recording medium as a file (referred to as a "data management file 51" hereinafter). The predetermined location of the recording medium corresponds to a predetermined block if the recording medium 9 is composed of the flash memory, or a predetermined sector and track if the recording medium 9 is composed of the magnetic disk.

Figure 3:
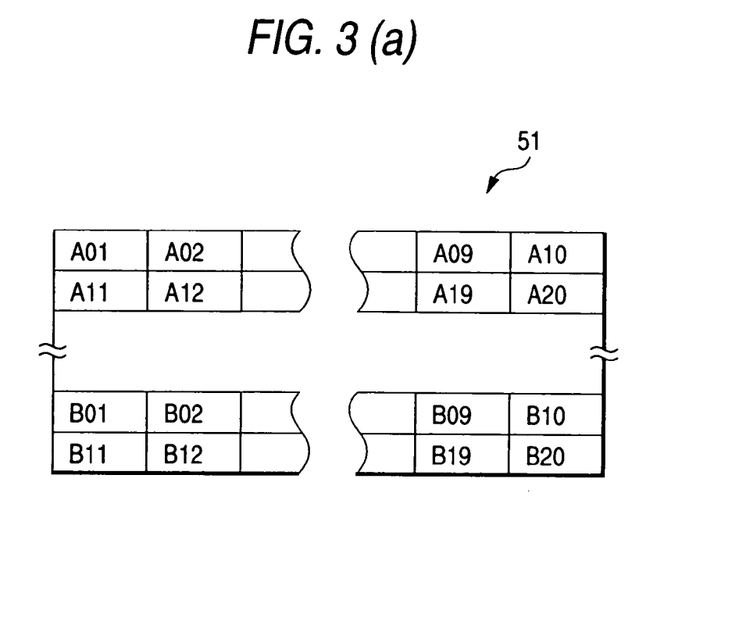
FIGS. 3(a) and 3(b) are views showing an example of a configuration of a data management file.

FIGS. 3(a) and (b) show an example of the data management file 51. The data management file 51 has a management record 510 every image data, and such management record comprises at least an image number (or ID number) 511, a recording start position 512 and a recording end position 513 of the image data, a pointer 514 indicating a continuous recording start position, an associated image number 515, and a write inhibit/enable flag 516.

The image number 511 consists of a data type code and a number. The thumbnail image data, the image data, etc. are present as the data type, and the data type code is defined such that the thumbnail image data are indicated by "A", the image data are indicated by "B", or the like.

Normally the recorded address of the image is written into the recording start position 512 and the recording end position 513. If the recording medium 9 is composed of the flash memory, the block number of the corresponding image data is written thereinto.

The pointer indicates a continuous recording start position which is searched by the recording medium controller 8 when an area where one data is to be written is smaller in size of the data and which is separated from the area where the one data is to be written. According to use of the pointer, the data can be logically continuously loaded and read. In this case, if the recording end position coincides with the end position of the loaded data, a special code, e.g., 0000, is written into the pointer 514.

The associated image number 515 records the image number of the corresponding thumbnail image data if the concerned data are the image data, or the image number of the corresponding image data if the concerned data are the thumbnail image data. In this event, as shown in FIG. 3(a), if thumbnail image management records and JPEG image management records correspond to each other at a fixed distance (address distance), the associated image number 515 should not be provided since the thumbnail image management records and the JPEG image management records can be correlated with each other.

As for the write inhibit/enable flag 516, normally the write inhibit code is written when the data are loaded while the write enable code is written when the data are deleted, etc. Since the data management section 50 checks the flag 516, then treats the data in the area which is defined by the recording start position 512 and the recording end position 513 and the in area which is defined by the pointer 514 as the read inhibit data, the image data can be logically deleted in fact when the write enable flag is written into the area.

The data management section 50 is not limited to the above system. The data management section 50 may be constructed to write several places of data identification numbers to head positions of the thumbnail image data and the JPEG image data, for example, A01 to An for the thumbnail image data and B01 to Bn for the JPEG image data upon loading the data, and then to manage recording information such as attributes, write location, occupied areas, etc. of respective data by searching the identification numbers from the head of the recording medium.

As the method of changing processing sequence of the recorded image data, there are change of physical sequence of the image data and change of logical sequence of the image data.

As a particular example of change of physical sequence of the image data, in the image data recorded in the order of the image numbers A010, A020, A030, . . . , An-1, An, an example in which A011 picked up after An is inserted after A010 will be considered. First, the image data of the image number A020 are saved to the RAM 42, then the image data of the image number A011 are written into the location of the image data of the image number A020, and then the image data of the image number A011 are canceled from the original location. Then, the image data of the image number A030 are saved into the RAM 42, and then the image data of the image number A020 which have already been saved in the RAM 42 are written into the location of the image data of the image number A030. All image data are replaced in the order of the image numbers A010, A011, A020, A030, . . . , An-1, An by repeating the above operations.

The above method is suitable for sequence change in the record which has a relatively small data size, e.g., sorting of a key record of the index file. It is difficult to save the image data having the large data size into the RAM 42 having a small capacity. Since save and load must be repeated in unit of block, or the like to write one image data, the image data must be saved into a working memory, e.g., for which the frame memory 6 is substituted, in practice. However, since the number of writing times of the flash memory cannot be assured only about ten thousand times if the flash memory is employed as the built-in recording medium 9, it is impossible to say that it is not desired to repeat load/cancel operations many times in changing the sequence of the image.

Next, the change of logical sequence of the image data will be explained with reference to FIGS. 3(a) and (b). The change of the processing sequence of the image data can be achieved by replacing the management record 510 registered in the data management file 51 in unit of the image number. Since the number of the management records which can be registered in the data management file 51 is small and also the size of the management record 510 which consists of the image number 511, the recording start position 512, the recording end position 513, and addition information (514 to 516) is small, the sequence of the management record 510 can be updated physically by loading the data management file 51 itself into the RAM 42. Also, the data management file 51 can be stored in the built-in memory medium 9 and the extended memory medium 10 respectively, but it may be stored in a rewritable memory such as EEPROM, etc.

Figure 4:
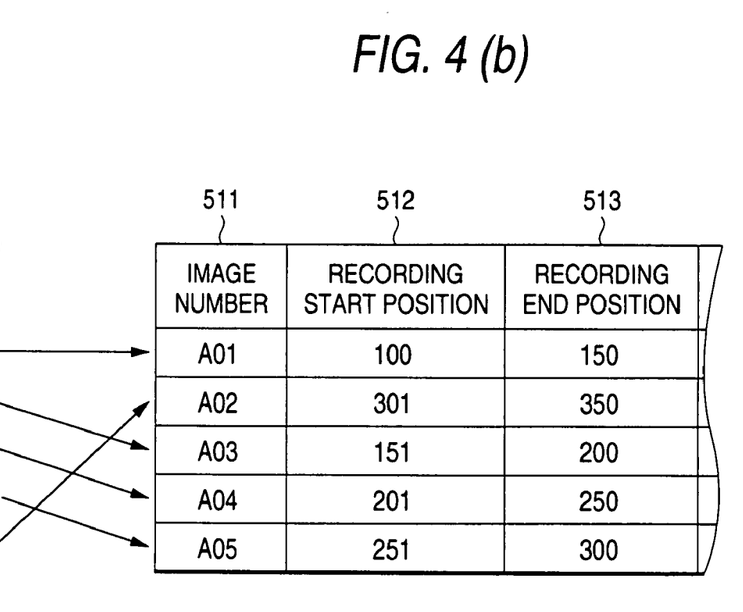
FIGS. 4(a) and 4(b) are views showing update of the data management file in order to change logically the image processing sequence.

FIGS. 4(a) and (b) are views showing the logical change of the processing sequence.

FIG. 4(a) shows the data management file 51 before the processing sequence is changed. FIG. 4(b) shows the data management file 51 after the processing sequence has been changed. For convenience of explanation, only the image number 511, the recording start position 512, and the recording end position 513 are illustrated for five image data.

In FIG. 4(a), it is assumed that the image of the image number A05 is inserted as an inserted image between A01 and A02. To begin with, the management records 510 of A02 to A04 are saved in the RAM 42, and then the management record 510 of A05 is loaded in the location A02. Then, when the management records 510 of A02 to A04 are loaded in the locations A03 to A05, the order of the management records 510 is A01, A05, A02, A03, A04 and thus A05 is inserted between A01 and A02. After this, as shown in FIG. 4(b), the image numbers are updated in ascending order like A01, A02, A03, A04, and A05. As a result, the image insertion can be achieved logically without the change of the physical location of the image data which are stored in the recording medium.

If the flash memory is employed as the built-in recording medium 9, the block number is written into the recording start position 512, the recording end position 513, and the pointer 514, and the data management file 51 itself is loaded in unit of block. Therefore, the new data management file 51 being changed as above can be implemented by saving all the data management files 51 in the RAM 42 once, and then canceling the contents of the block of the flash memory on which the data management files 51 has been written.

Other Embodiments of the Present Invention

Figure 5:
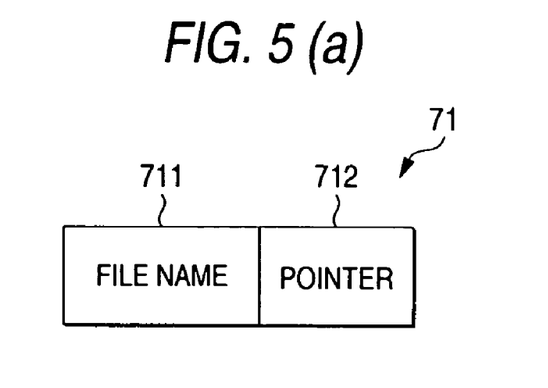
FIGS. 5(a)–5(c) are views showing an example of a configuration of another data management file.

Another example of data management by the data management section 50 is shown in FIGS. 5(a) to (c). The image data are managed by a file name management file 71, a file management table 72, and an image data 73. The file name management file 71 consists of a file name 711 for indicating each image data 731, and a pointer 712 for indicating a location in which the image data 731 is recorded. The above pointer 712, and a recording start location 721 and a recording end location 722 in which the image data 731 is recorded are stored in the file management table 72. In order to indicate the end of the image data, a special code, e.g., "FFFFFFFF" is written as the file name.

Another Embodiment 1

Figure 6:
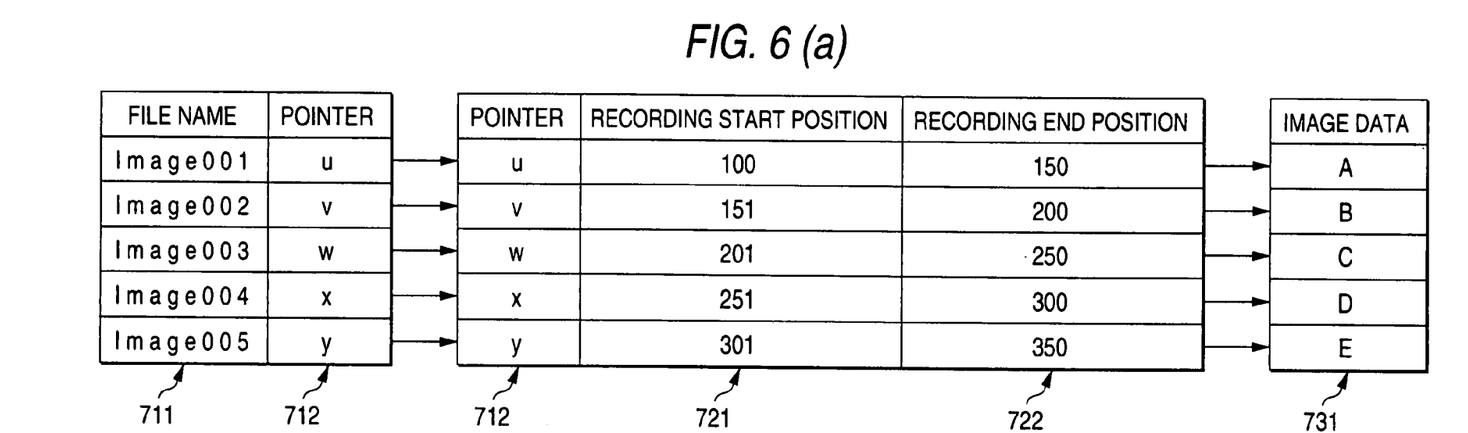
FIGS. 6(a) and 6(b) are views showing logical change of the image processing sequence by updating the data management file shown in FIG. 5.

The logical change of the processing sequence of the image data will be explained with reference to FIGS. 6(a) and (b).

The processing sequence of the image data is given in compliance with the stored order of the file names 711 stored in the file name management file 71. As shown in FIG. 6(a), it is assumed that the image data A corresponds to the file name of image 001 and then the image data B, C, D, E correspond to the file names of images 002 to 005 in sequence. At this time, the processing sequence can be given as the processing sequence of the image data A, B, C, D, E in compliance with the stored order of the file names 711.

Then, let us consider the case where the image data are arranged in the processing sequence of the image data A, E, B, C, D by updating the processing sequence of the image data. As shown in FIG. 6(b), the image data are updated by checking the pointer 712 in the file name management file 71. Since the pointer 712 in the file name management file 71 is not updated, the processing sequence of the image data is changed in the order of the image data A, E, B, C, D.

Another Embodiment 2

Although the processing sequence of the image data is set in the stored order of the file names 711 in the above another embodiment 1, data indicating the processing sequence will be attached to the file name 711 per se in this another Embodiment 2.

For instance, "XXX" in the image XXX of the file name 711 is managed as the data indicating the processing sequence. In the example shown is FIG. 6(a), since image 001 is first processed and then images 002, . . . , image 005 are processed in order suceedingly, the processing sequence of the image data 731 is given as the order of the image data A, B, C, D, E.

Figure 7:
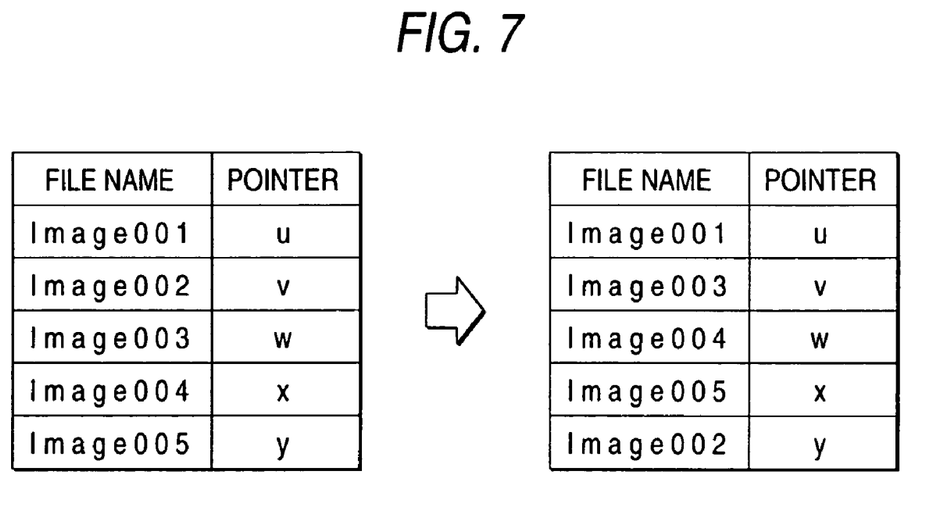
FIG. 7 is a view showing another logical change of the image processing sequence by updating the data management file shown in FIG. 5.

Next, let us consider the case where the above processing sequence is set in the order of the image data A, E, B, C, D. Since the processing sequence of the image data is given by the sequence of the numerals in the file names if only the file names 711 in the file name management table 71 are updated as shown in FIG. 7, such processing sequence of the image data can be changed on the order of the image data A, E, B, C, D.

Another Embodiment 3

Unless the image data management table is not particularly provided, the processing sequence can be changed by attaching information indicating the processing sequence to a part of the image data and then updating the information.

Embodiment 1

Figure 8:
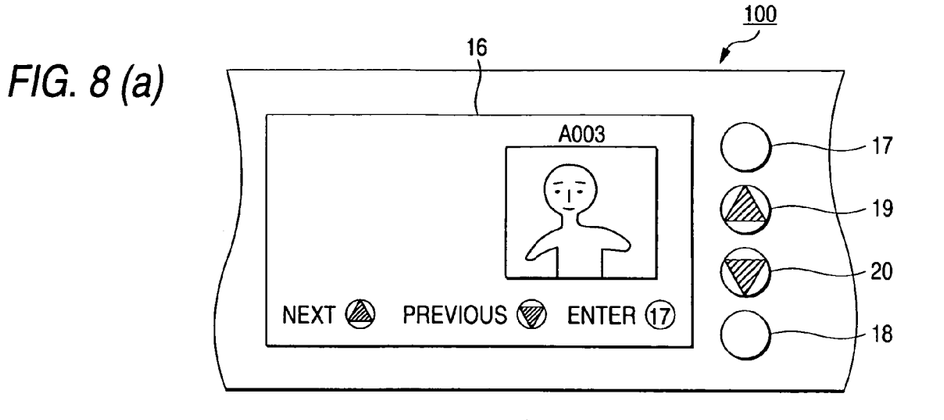
FIGS. 8(a)–8(c) are views showing an example of a image insertion display.
Figure 9:
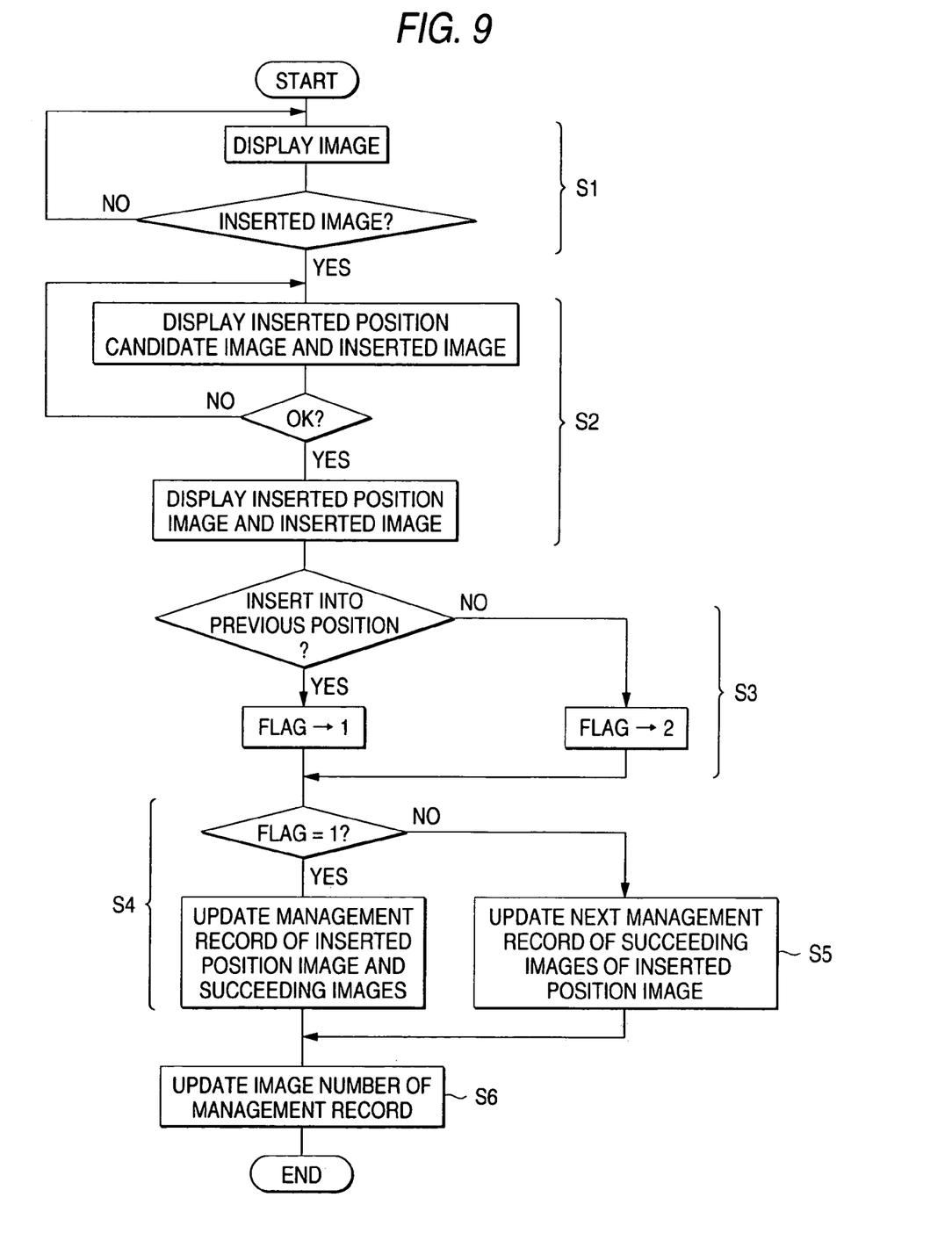
FIG. 9 is a flowchart showing an example of an operation of an image insertion section.

FIGS. 8(a) to (c) are views showing an example of a display screen on which an inserted image and an inserted position candidate image are displayed. FIG. 9 is a flowchart showing an example of an operation of an image insertion section 60.

(1) Display of Inserted Image and Inserted Position Candidate Image

In step S1, first the first thumbnail image on the recording medium as well as the image number is displayed. If the user continues to push a button 19, the thumbnail images as well as the image numbers are displayed continuously, as shown in FIG. 8(a). If the user pushes a button 20, the display returns to the thumbnail image which is precedingly displayed. If the user pushes the button 17 when the image to be inserted is displayed, the desired inserted image and the mountain landscape image of the image number A051 can be displayed fixedly on the right side of the screen, as shown in FIG. 8(b).

In step S2, the first thumbnail image A001 (portrait image) is displayed as the inserted position candidate image on the left side of the screen. For example, if the user desires to combine the suceedingly picked-up mountain landscape image A051 with the precedingly picked-up mountain landscape image together and then pushes a button 19 to search the mountain landscape image, the thumbnail images are displayed subsequently. If the user pushes the button 20, the screen returns to the precedingly displayed thumbnail image. If the user pushes the button 17 when the desired mountain landscape image A020 is displayed, the image A020 can be displayed fixedly as the inserted position candidate image on the left side of the screen. The processing advances to step S3.

(2) Decision of Image Insertion Position

In step S3, the inserted position deciding screen in FIG. 8(c) is displayed to promote the user to decide that the inserted image A051 should be inserted before the image A020 or after the image A020. If the user pushes the button 19 to insert the inserted image A051 before the image A020, the image A051 and the image A020 are switched and displayed on the left side and the right side respectively. If the user pushes the button 19 to insert the inserted image A051 after the image A020, the image A051 and the image A020 are displayed as they are. In either case, flashing the OK mark requests the user to confirm them. If the button 17 is pushed, an insertion flag is set to "1" when the inserted image A051 should be inserted before the image A020 while the insertion flag is set to "2" when the inserted image A051 should be inserted after the image A020, and then the processing goes to step S4.

(3) Image Insertion

In step S4, the management record 510 of the image number A051 is held by searching the data management file 51. If the flag is "1" the management records 510 of the image number A051 and subsequent image numbers are read from the data management file 51, and then saved in the RAM 42. The management record 510 of the image number A051 is loaded into the location of the management record 510 of the image number A020 in the data management file 51. The management record 510 which has been saved in the RAM 42 is then read, and then written in next recording locations subsequently. Then, the processing goes to step S6. Since the image number (associated image number 515) of the corresponding JPEG image is written in the thumbnail image, the sequence of the management record 510 of the JPEG image can be similarly changed. If the insertion flag is set to "2", step S5 is carried out.

In step S5, the management records 510 of the image number A021 following to the image number A020 and subsequent image numbers are read from the data management file 51, and then saved in the RAM 42. The management records 510 of the image number A051 is loaded into the location of the management records 510 of the image number A021 in the data management file 51, and then the management records 510 which have been saved in the RAM 42 are read and written into the succeeding recording locations successively. Then, the processing is shifted to step S6. In this case, the sequence of the management records 510 of the JPEG images can be similarly changed.

In step S6, the thumbnail image management record of the data management file 51, the image number 511 of the JPEG image management record, and the associated image number 515 are updated in ascending order.

According to the above steps, the desired inserted image can be logically inserted into the desired locations. Since the data recording medium controller 8 refers to the data management file 51 in reading/loading or deleting the image data, the image data train can be output in accordance with the sequence of the management record 510 in the data management file 51 at the time of display onto the liquid crystal display 16 or output of the image data to the external device.

Embodiment 2

Figure 10:
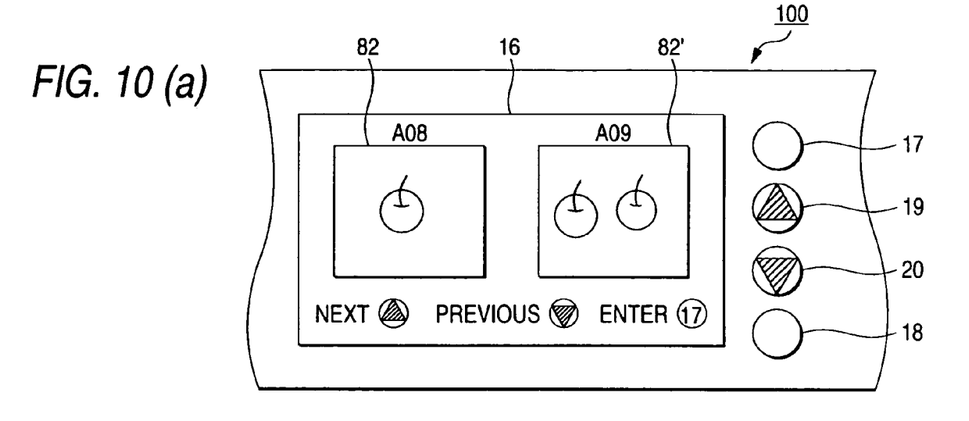
FIGS. 10(a)–10(c) are views showing another example of the image insertion display.
Figure 11:
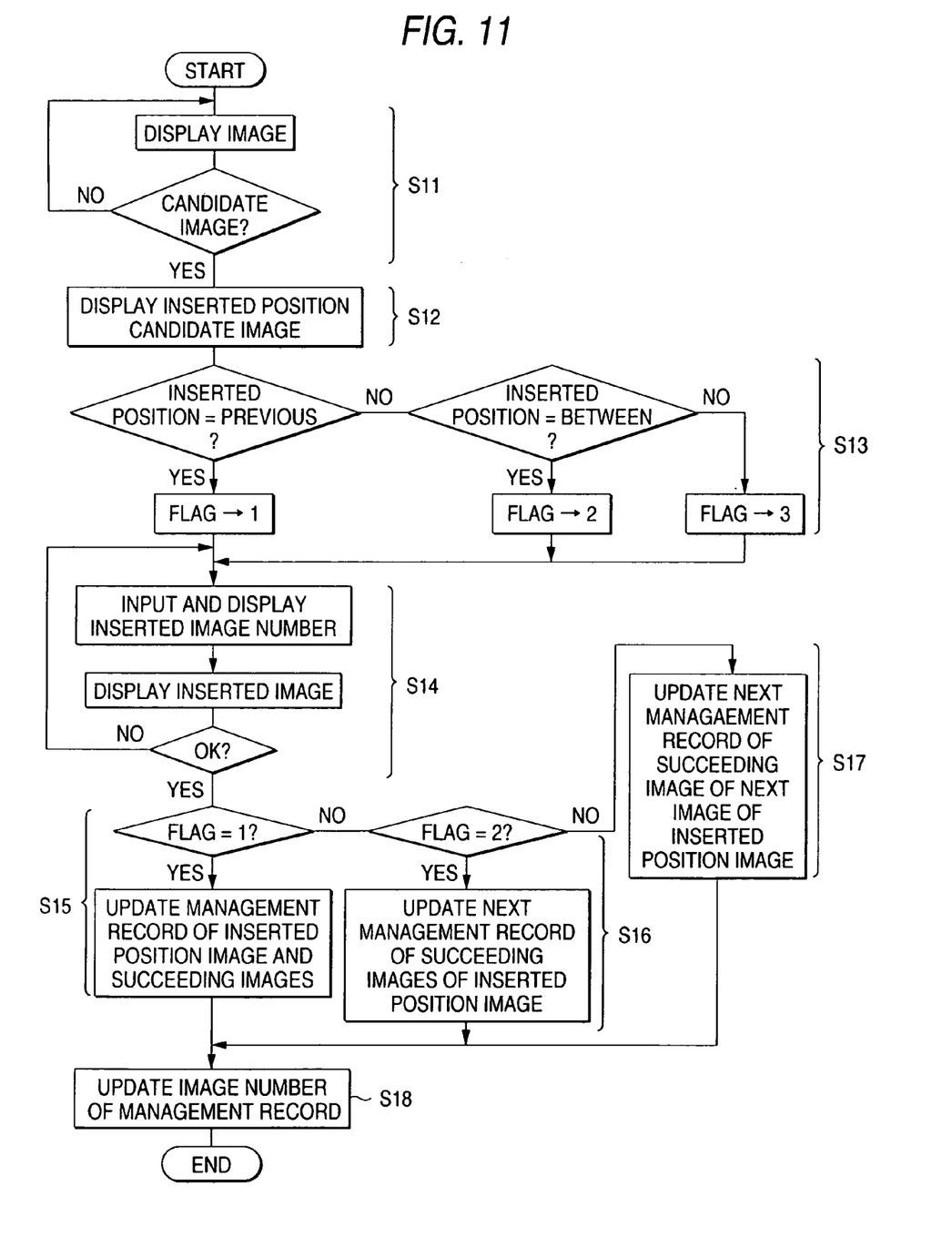
FIG. 11 is a flowchart showing another example of the operation of the image insertion section.

FIGS. 10(*a*) and (*b*) are examples of the display screen on which only the inserted position candidate image is displayed. FIG. 11 is a flowchart showing the operation of the image insertion section 60.

(1) Display of Inserted Image and Inserted Position Candidate Image

In step S11 in FIG. 11, first the first thumbnail image on the recording medium together with the image number is displayed. If the user continues to push the button 19, the thumbnail images as well as the image numbers are displayed continuously as the inserted position candidate image, as shown in FIG. 10(*a*). If the user pushes the button 20, the display returns to the precedingly displayed thumbnail image. If the user pushes the button 17, the processing goes to step S12.

For example, it is assumed that the image number of the desired fish image to be inserted (not shown), e.g., A56, is stored and then the image A56 is inserted into the location of the previously picked-up fish image by looking for such location. If the user continues to push the button 19, the inserted position candidate images 82, 82' are displayed, as shown in FIG. 10(*a*). When the images are displayed by operating the buttons 19, 20, and then the user, if finds the fish image, pushes the button 17. When the button 17 is pushed, the processing goes to step S12.

(2) Decision of Image Insertion Position

In step S12, the inserted position deciding screen in FIG. 10(*b*) is displayed to promote the user to decide that the stored image A56 to be inserted should be inserted before the image A11, or between the images A11 and A12, or after the image A12.

If the user pushes the button 19, the insertion flag is set to "1" to insert the inserted image before the image A11. If the user pushes the button 20, the insertion flag is set to "2" to insert the inserted image between the images A11 and A12. If the user pushes the button 18, the insertion flag is set to "3" to insert the inserted image after the image A12.

(3) Image Insertion

In step S14, when the user pushes the button 19 shown in FIG. 10(*c*) one time, "10" is added to the inserted image counter and the counter value is displayed on the liquid crystal display 16. When the user pushes the button 17, the thumbnail image of the concerned image number is displayed, and then the processing goes to step S15. While, if the button 18 is pushed as the error, then the counter value is set to "0" and the display returns to the display shown in FIG. 10(*c*).

In step S15, the management record 510 of the image number A56 is held by searching the data management file 51. If the flag is "1", the management records 510 of the image number A051 and subsequent image numbers are read from the data management file 51, and then saved in the RAM 42. The management record 510 of the image number A56 is loaded into the location of the management record 510 of the image number A11 in the data management file 51. The management record 510 which has been saved in the RAM 42 is then read, and then written in next recording locations subsequently. Then, the processing goes to step S18. Since the image number of the corresponding JPEG image is written in the thumbnail image, the sequence of the management record 510 of the JPEG image can be similarly changed.

In step S16, if the image insertion flag is set to "2", the management records 510 of the image number A12 and subsequent image numbers are read from the data management file 51 and saved in the RAM 42. The management record 510 of the image number A56 is loaded into the location of the management record 510 of the image number A12 in the data management file 51. The management record 510 which has been saved in the RAM 42 is then read, and then written in next recording locations subsequently. Then, the processing goes to step S18. The sequence of the management record 510 of the JPEG image can be similarly changed.

In step S17, if the image insertion flag is set to "3", the management records 510 of the image number A13 and subsequent image numbers are read from the data management file 51 and saved in the RAM 42. The management record 510 of the image number A56 is loaded into the location of the management record 510 of the image number A13 in the data management file 51. The management record 510 which has been saved in the RAM 42 is then read, and then written in next recording locations subsequently. Then, the processing goes to step S18. The sequence of the management record 510 of the JPEG image can be similarly changed.

In step S18, the thumbnail image management record 510 of the data management file 51, the image number 511 of the JPEG image management record 510, and the associated image number 515 are updated in ascending order.

The embodiments of the present invention have been explained as above, but it is needless to say that the present invention should not be interpreted to be limited to the above embodiments and various variations and modifications may be adopted.

According to any digital camera or any method of changing processing sequence of recorded image data of the present invention, the processing sequence of the image data can be changed. Therefore, the image data can be displayed in good order on the liquid crystal display as associated images. The image data to be output to the external device can also be output in good order as associated image data.

What is claimed is:

1. A digital camera for recording image data onto a recording medium by converting an image pickup light photoelectrically, comprising:

an image data management file for storing a plurality of recording information having a processing sequence, an image type and a recording location of the recorded image data, the image data management file being stored in the recording medium separately from the image data; and means for updating the image data management file, wherein the processing sequence of the recorded image data is updated by changing record location information of the recorded image data to record location information of another recorded image data.

2. The digital camera as set forth in claim 1, further comprising:

display means for displaying the recorded image data, wherein an order of which the image data are displayed on the display means is changed in compliance with the change of the processing sequence.

3. The digital camera as set forth in claim 1, further comprising:

output means for outputting the recorded image data to an external device, wherein an order of which the image data are outputted to the external device is changed in compliance with the change of the processing sequence.

4. A method of changing processing sequence of image data recorded in a recording medium of a digital camera by converting an image pick up light photoelectrically, the digital camera with an image data management file for storing a plurality of recording information having a processing sequence and a recording location information of the recorded image data, the image data management file stored into the recording medium separately from the image data, the method comprising:

deciding processing sequence of predetermined image data; and updating the processing sequence of the recorded image data by changing recording location information of the recorded image data to record location information of another recorded image data.

5. A digital camera for recording image data onto a recording medium by converting an image pickup light photoelectrically, comprising:

an image data management file having a plurality of management records for recorded image data; and means for updating said image data management file, wherein each of said management records has at least record location information, image data type and an image number, a plurality of which form a processing sequence of said recorded image data; and wherein the processing sequence of the recorded image data is updated by changing the record location information of the recorded image data to another record location information of another recorded image data.

6. The digital camera as set forth in claim 5, further comprising:

display means for displaying the recorded image data, wherein an order of which the image data are displayed on the display means is changed in compliance with the change of the processing sequence.

7. The digital camera as set forth in claim 5, further comprising:

output means for outputting the recorded image data to an external device, wherein an order of which the image data are outputted to the external device is changed in compliance with the change of the processing sequence.

8. The digital camera as set forth in claim 5, wherein said management file is updated by changing at least one said record location for at least one said image number of said management records, thereby changing said processing sequence.

9. The method according to claim 4, wherein said image data comprises at least two file format types.

10. The method according to claim 9, wherein a record for an image data in one format is correlated to a record of a respective image data in another format.

11. The digital camera according to claim 1, wherein the record location information is a pointer to a storage location of a respective image data.

12. The digital camera according to claim 1, further comprising means for receiving a user request for a change of the processing sequence, where said request comprises selecting an image from the image data and a position for the image in the processing sequence; and wherein the updating means updates the image data management file based on the user request.

13. The digital camera according to claim 1, wherein the image type is a format of the image and wherein the record location information is a parameter identifying at least one of a start position and an end position of a storage location that stores a respective image data.

14. The digital camera according to claim 1, wherein the image data management file is provided separately from the image data, and wherein the processing sequence is logically changed by changing the record location information while physical location of the image data remains unchanged.

* * * * *